US012680536B2

(12) United States Patent
Hang

(10) Patent No.: US 12,680,536 B2
(45) Date of Patent: Jul. 14, 2026

(54) SINGLE-MATERIAL HAND PUMP

(71) Applicant: NINGBO JINYU TECHNOLOGY INDUSTRY CO., LTD., Yuyao (CN)

(72) Inventor: Cheng Hang, Yuyao (CN)

(73) Assignee: NINGBO JINYU TECHNOLOGY INDUSTRY CO., LTD., Yuyao (CN)

( * ) Notice: Subject to any disclaimer, the term of this patent is extended or adjusted under 35 U.S.C. 154(b) by 142 days.

(21) Appl. No.: 17/908,544

(22) PCT Filed: Jun. 6, 2022

(86) PCT No.: PCT/CN2022/097062
§ 371 (c)(1),
(2) Date: Oct. 9, 2024

(87) PCT Pub. No.: WO2023/165039
PCT Pub. Date: Sep. 7, 2023

(65) Prior Publication Data

US 2025/0035098 A1 Jan. 30, 2025

(30) Foreign Application Priority Data

Mar. 3, 2022 (CN) ......................... 202220455011.9

(51) Int. Cl.
*B05B 11/10* (2023.01)
*F04B 33/00* (2006.01)
*F04B 53/16* (2006.01)

(52) U.S. Cl.
CPC .......... *F04B 33/00* (2013.01); *B05B 11/1001* (2023.01); *B05B 11/1077* (2023.01); *F04B 53/16* (2013.01)

(58) Field of Classification Search
CPC . B05B 11/00; B05B 11/1001; B05B 11/1023; B05B 11/1047; B05B 11/1067; B05B 11/1077; F04B 9/14; F04B 33/00; F04B 53/00; F04B 53/16
USPC .......................................................... 222/401
See application file for complete search history.

(56) References Cited

U.S. PATENT DOCUMENTS

2023/0201852 A1* 6/2023 Goettke .............. B05B 11/0089 222/401
2023/0264218 A1* 8/2023 Liang .................. B05B 11/1074 222/401
2024/0367190 A1* 11/2024 Liang .................. B05B 11/1074
2025/0010320 A1* 1/2025 Knight ................ B05B 11/1059
2025/0041888 A1* 2/2025 Mittal ................. B05B 11/1001

* cited by examiner

*Primary Examiner* — Luan K Bui
(74) *Attorney, Agent, or Firm* — Jose Cherson Weissbrot

(57) ABSTRACT

The present invention relates to the technical field of hand pump, in particular to a novel single-material hand pump, which includes a pressure head, a valve stem, an elastic part and a cylinder, wherein the bottom of the pressure head is fixedly connected with the valve stem, the cylinder is arranged at the bottom of the valve stem, the valve stem is connected with the cylinder in an embedded way, not only the elliptical columns contract uniformly under pressure and have good resilience, but also the elastic part is made of elastoplastic, the separate removal of metal spring is not required for saving the treatment time and improving the environmental protection, and the air holes are used for absorbing or discharging the compressed air inside the elastic part, thereby solving the problems of internal negative pressure, failure to reset the elastic part and retract the elastic part.

10 Claims, 3 Drawing Sheets

SINGLE-MATERIAL HAND PUMP

TECHNICAL FIELD

The present invention relates to the technical field of hand pump, in particular to a novel single-material hand pump.

BACKGROUND

The hand pump is a machine changing the fluid pressure in the container or conveying the fluid by manual mode, which is also called manual pump. The existing hand pump structures are much of a muchness, most of the internal springs are metal threaded springs, and deformation and reduced resilience will occur after long-time use. When the plastic parts are recycled, the recycling personnel need to dismantle each part of the hand pump and separately pick out the internal metal parts, which increases the operation steps for recycling the hand pump, wastes time and energy, improves the recycling cost and results in low recycling value of many hand pumps.

SUMMARY

Aiming at the above problems in the related art, the present invention provides a novel single-material hand pump.

The present invention adopts the following technical proposal:

The present invention designs a novel single-material hand pump, which includes a pressure head, a valve stem, an elastic part and a cylinder, wherein the bottom of the pressure head is fixedly connected with the valve stein, the cylinder is arranged at the bottom of the valve stem, the valve stem is connected with the cylinder in an embedded way, the elastic part is arranged at the top of the cylinder, the pressure head is connected to one end where the elastic part is far away from the cylinder, and air holes are arranged outside the elastic part.

Further, a waterproof ring is arranged outside the valve stem, and the outer part of the waterproof ring is fixedly connected with a threaded sleeve.

Further, the bottom of the valve stem is movably connected with a piston, and a valve needle is arranged at the bottom of the piston, and the piston is located inside the cylinder.

Further, a suction pipe is embedded at the bottom of the cylinder.

Further, a gasket is arranged at the connection between the cylinder and the threaded sleeve.

Further, a plastic bead is arranged at the bottom of the cylinder and located at the top of the suction pipe.

Further, the cylinder is fixedly connected with a bushing, which is located above the piston.

Further, the cross section of the elastic part is an arc structure arching outward.

Further, the elastic part is made of elastoplastic.

Further, a mounting groove is arranged at the bottom of the elastic part, and the bushing is located inside the mounting groove.

The technical proposal has the following advantages or beneficial effects:

The cylinder is arranged at the bottom of the valve stein, the valve stem is connected with the cylinder in an embedded way, the elastic part is located at the top of the cylinder, the pressure head is connected to one end where the elastic part is far away from the cylinder, the elastic part is arranged by superposing a plurality of elliptical columns, the elliptical columns contract under pressure and extend to both sides when the elastic part is under stress, not only the elliptical columns contract uniformly under pressure and have good resilience, but also the elastic part is made of elastoplastic, which replaces the traditional metal threaded elastic part, the separate removal of metal spring is not required for subsequent recycling of the device to save the treatment time and improve the environmental protection property;

Further, the air holes are arranged outside the elastic part and used to absorb or discharge the compressed air inside the elastic part, thereby solving the problems of internal negative pressure, failure to reset the elastic part and failure to retract the elastic part due to strengthened air pressure inside the elastic part after the air inside the elastic part is exhausted, in order that the elastic part can restore the original state after air is compressed.

BRIEF DESCRIPTION OF THE DRAWINGS

Refer to the drawings to more fully describe the example of the present invention. However, the drawings are for illustration and elaboration only and do not constitute a limitation to the scope of the present invention.

Figure 1:
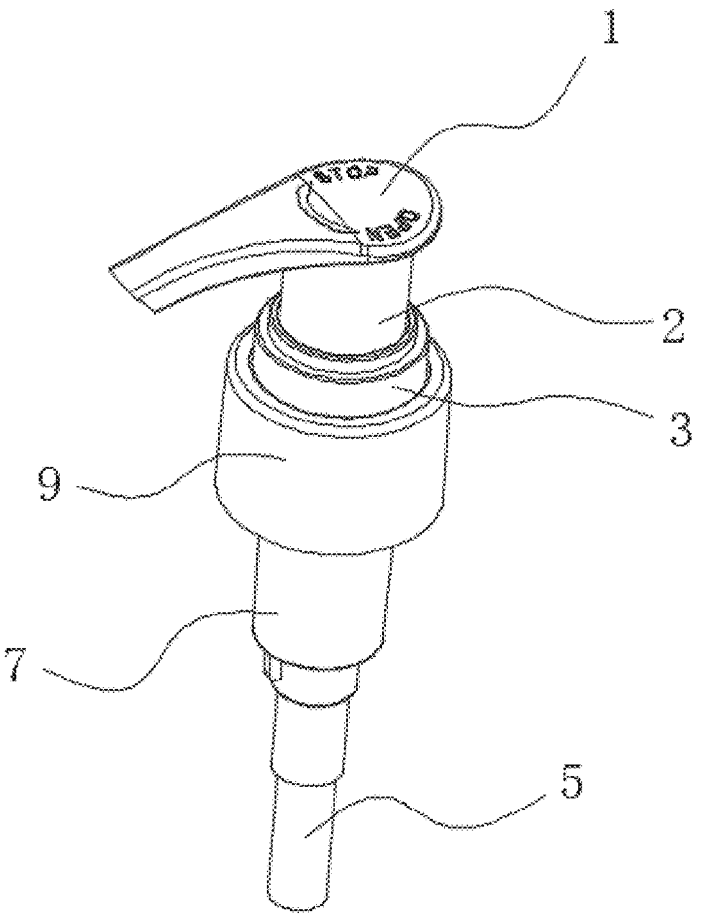
FIG. 1 is the structure diagram of a novel single-material hand pump proposed by the present invention.

The drawing reference signs indicate: pressure head—1, valve stem—2, waterproof ring—3, gasket—4, suction pipe—5, elastic part—6, cylinder—7, valve needle—8, threaded sleeve—9, bushing—10, plastic bead—11, piston—12, hole—13.

DETAILED DESCRIPTION OF THE EMBODIMENT

The technical proposal in the example of the present invention will be clearly and completely described below in combination with the drawings in the example of the present invention. Obviously, the described example is only part of the examples of the present invention, but not all examples. Based on the example in the present invention, all other examples obtained by ordinary technicians in the field without making creative work fall within the scope of protection of the present invention.

It should be noted that the example in the present invention and the characteristics in the example can be combined with each other without conflict.

The following is a further description of the present invention in combination with the drawings and example, but not regarded as the limitation to the present invention.

Figure 2:
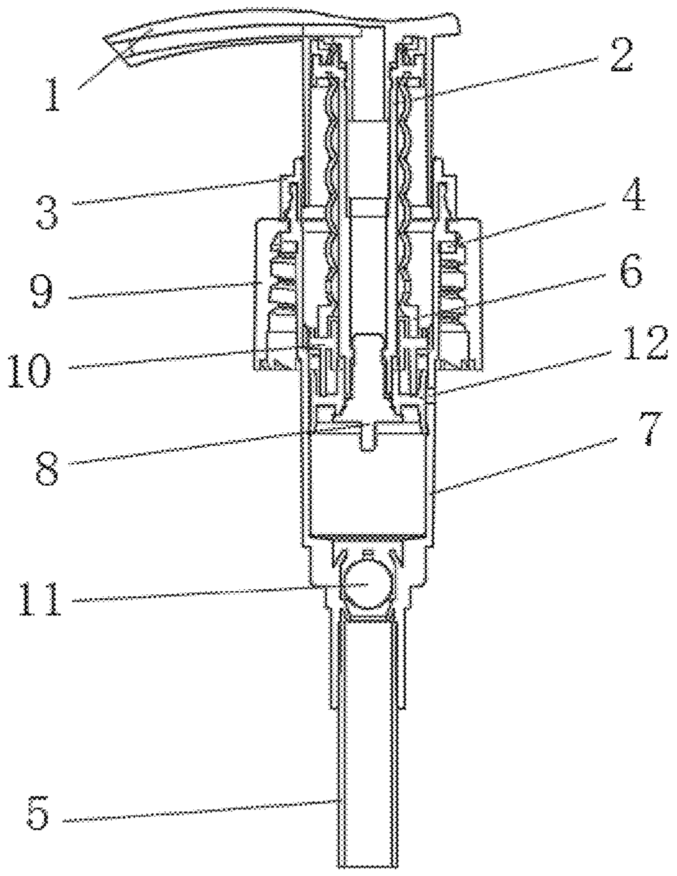
FIG. 2 is the internal structure diagram of a novel single-material hand pump proposed by the present invention.
Figure 3:
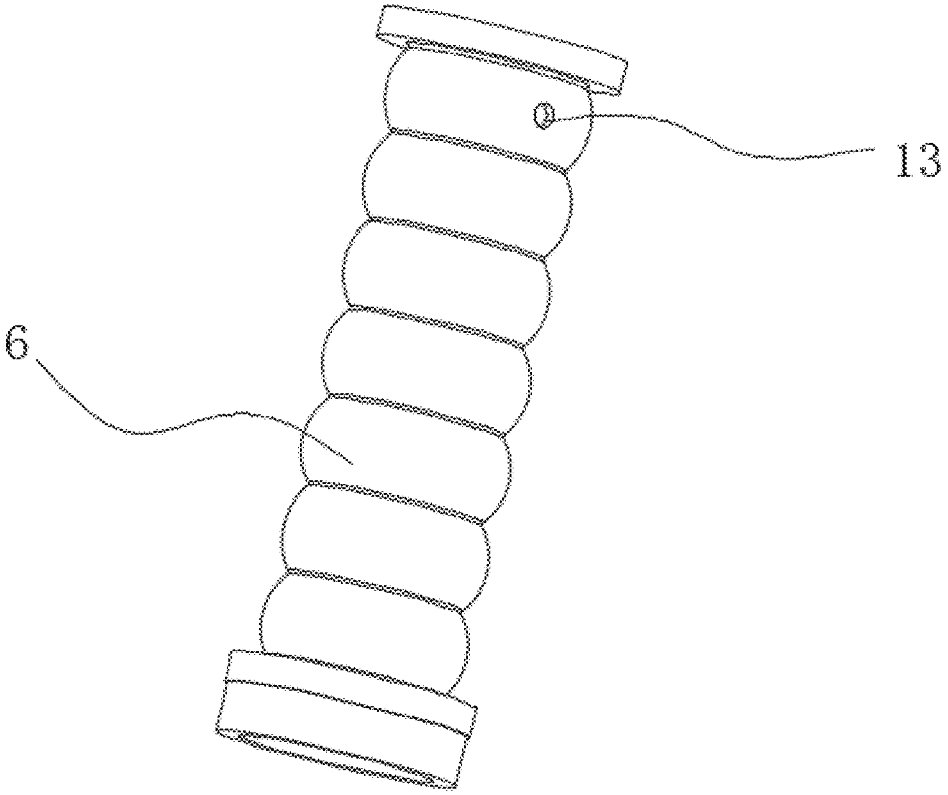
FIG. 3 is the structure diagram for the elastic part of a novel single-material hand pump proposed by the present invention.

Refer to FIG. 1 to FIG. 3. A novel single-material hand pump includes a pressure head 1, a valve stem 2, an elastic part 6 and a cylinder 7, wherein the bottom of the pressure head 1 is fixedly connected with the valve stem 2, the cylinder 7 is arranged at the bottom of the valve stein 2, the valve stein 2 is connected with the cylinder 7 in an embedded way, the elastic part 6 is located at the top of the cylinder 7, the pressure head 1 is connected to one end where the elastic part 6 is far away from the cylinder 7, air holes 7 are arranged outside the elastic part 6, the elastic part 6 is arranged by superposing a plurality of elliptical columns, the elliptical columns contract under pressure and extend to both sides when the elastic part 6 is under stress, not only the elliptical columns contract uniformly under pressure and have good resilience, but also the elastic part 6 is made of elastoplastic, which replaces the traditional metal threaded elastic part 6, the separate removal of metal spring is not required for subsequent recycling of the device to save the treatment time and improve the environmental protection, and further the air holes 7 are arranged outside the elastic part 6 and used to absorb or discharge the compressed air inside the elastic part 6, thereby solving the problems of internal negative pressure, failure to reset the elastic part 6 and failure to retract the elastic part 6 due to strengthened air pressure inside the elastic part 6 after the air inside the elastic part 6 is exhausted, in order that the elastic part 6 can restore the original state after air is compressed.

Further, a waterproof ring 3 is arranged outside the valve stem, the outer part of the waterproof ring 3 is fixedly connected with a threaded sleeve 9, and the waterproof ring 3 can provide a longitudinal movement limit for the inner valve stem 2.

Further, the bottom of the valve stem 2 is connected with the piston 12, a valve needle 8 is arranged at the bottom of the piston 12, which is located inside the cylinder 7 and moves longitudinally inside the cylinder 7 to discharge the compressed air and generate suction force to absorb the liquid inside the container.

Further, a suction pipe 5 is embedded at the bottom of cylinder 7 and used to extend to the inside of the container to absorb the liquid.

Further, a gasket 4 is arranged at the connection between the cylinder 7 and the threaded sleeve 9 and used to provide support for the threaded sleeve 9.

Further, a plastic bead 11 is arranged at the bottom of the cylinder 7, is located on the top of the suction pipe 5, also replaces the traditional metal bead and is made of the same plastic material as the device.

Further, the cylinder 7 is fixedly connected with the bushing 10, which is located above the piston 12.

Further, the cross section of the elastic part 6 is an arc structure arching outward, the elastic part 6 is a spring column; when the elastic part 6 is under stress, the elliptic column extends to both sides, the pressure is uniform, and the resilience is good.

Further, the elastic part 6 is made of elastoplastic, which is the same as that of the device, thereby avoiding the problem that the metal spring needs to be disassembled separately.

Further, a mounting groove is arranged at the bottom of the elastic part 6, and the bushing 10 is located inside the mounting groove and used to provide support for the elastic part 6.

Operating principle:

when using the device, firstly insert the cylinder 7 with the suction pipe 5 into the container, rotate the threaded sleeve 9 so that the threaded sleeve 9 is connected with the thread groove outside the container, and then press the pressure head 1, the elastic part 6 at the bottom of the pressure head 1 contracts under stress so that the elliptical columns extend to both sides, the pressure head 1 is under stress to drive the valve stein 2 at the bottom to move down, and the valve stem 2 pushes down the piston 12 at the bottom so that the piston 12 moves towards the bottom of the valve body; release the pressure head 1, the elastic part 6 pushes the pressure head 1 upward for resetting by own elastic force after the elastic part 6 is not under stress; when the valve stem 2 drives the piston 12 to move up, the liquid in the container is pumped into the cylinder 7 by the internal negative pressure inside the cylinder 7; press the valve stem 2 again, and then the liquid in the cylinder 7 flows into the valve stem 2 through valve needle 8 and is drained from the top of pressure head 1.

The above example is the preferred example of the present invention, not to limit the embodiment and scope of protection of the present invention. For technicians in the field should be able to realize that the proposal obtained by making equivalent replacement and obvious changes using the specification and drawings of the present invention shall be included in the scope of protection of the present invention.

What is claimed:

1. A novel single-material hand pump comprising,
a pressure head;
a valve stem;
an elastic part; and
a cylinder;
wherein the bottom of the pressure head is fixedly connected with the valve stem, the cylinder is arranged at the bottom of the valve stem, the valve stem is connected with the cylinder in an embedded way, the elastic part is located at the top of the cylinder, the pressure head is connected to one end where the elastic part is far away from the cylinder, and air holes are arranged outside the elastic part.

2. The novel single-material hand pump of claim 1, wherein a waterproof ring is arranged outside the valve stem, and the outer part of the waterproof ring is fixedly connected with a threaded sleeve.

3. The novel single-material hand pump of claim 1, wherein the bottom of the valve stem is movably connected with a piston, and a valve needle is arranged at the bottom of the piston, and the piston is located inside the cylinder.

4. The novel single-material hand pump of claim 1, wherein a suction pipe is embedded at the bottom of the cylinder.

5. The novel single-material hand pump of claim 1, wherein a gasket is arranged at the connection between the cylinder and the threaded sleeve.

6. The novel single-material hand pump of claim 4, wherein a plastic bead is arranged at the bottom of the cylinder and located at the top of the suction pipe.

7. The novel single-material hand pump of claim 3, wherein the cylinder is fixedly connected with a bushing, which is located above the piston.

8. The novel single-material hand pump of claim 1, wherein the cross section of the elastic part is an arc structure arching outward.

9. The novel single-material hand pump of claim 1, wherein the elastic part is made of elastoplastic.

10. A novel single-material hand pump of claim 7, wherein a mounting groove is arranged at the bottom of the elastic part, and the bushing is located inside the mounting groove.

* * * * *